United States Patent [19]
Mizuno et al.

[11] Patent Number: 5,315,434
[45] Date of Patent: May 24, 1994

[54] INFRARED-TRANSMISSIVE LENS AND HUMAN BODY DETECTING SENSOR USING THE SAME

[75] Inventors: Yasuo Mizuno, Hirakata; Masakatsu Sugai, Osaka; Masaki Ikeda; Akihiko Yoshida, both of Hirakata, all of Japan

[73] Assignee: Matsushita Electric Industrial Co., Ltd., Osaka, Japan

[21] Appl. No.: 882,906

[22] Filed: May 14, 1992

[30] Foreign Application Priority Data

May 21, 1991 [JP] Japan .................................. 3-115997
Jul. 24, 1991 [JP] Japan .................................. 3-184462

[51] Int. Cl.$^5$ .................... G02B 1/02; G02B 13/14; G01J 5/00
[52] U.S. Cl. ................... 359/355; 250/338.1; 250/338.3; 250/353; 359/356
[58] Field of Search ............ 359/350, 355, 356, 357; 385/144; 250/338.1, 338.3, 353

[56] References Cited

U.S. PATENT DOCUMENTS

| | | |
|---|---|---|
| 3,371,211 | 2/1968 | Brau . |
| 3,397,314 | 8/1968 | Weiner .................. 250/353 |
| 3,655,255 | 4/1972 | Krause et al. ............ 359/350 |
| 3,699,339 | 10/1972 | Taczak, Jr. ............ 250/353 |
| 4,710,630 | 12/1987 | Kuppenheimer, Jr. et al. ... 250/353 |
| 4,769,545 | 9/1988 | Fraden ................... 250/353 |
| 4,828,354 | 5/1989 | Yoshida .................. 385/144 |
| 4,867,544 | 9/1989 | Bornstein et al. ......... 359/356 |
| 4,871,219 | 10/1989 | Cooper ................... 359/356 |
| 4,999,005 | 3/1991 | Cooper ................... 359/784 |
| 5,006,711 | 4/1991 | Hamashima et al. ....... 250/353 |

FOREIGN PATENT DOCUMENTS

| | | |
|---|---|---|
| 0354451 | 2/1990 | European Pat. Off. . |
| 1621002 | 5/1970 | Fed. Rep. of Germany . |
| 1548159 | 11/1968 | France . |
| 61-264227 | 11/1986 | Japan .................. 250/353 |

OTHER PUBLICATIONS

M. Vlcek, et al "Preparation of germanium-antimony-sulfur glasses with reduced hydrogen content and their stability under atmospheric conditions," Chemical Abstracts, vol. 110, No. 12, abstract No. 217702E, p. 315, Jun. 12, 1989.

C. N. J. Wagner, et al "The Structure of $(Ge_{0.33}S_{0.67})_{1-x}Br_x$ and $(Ge_{0.33}S_{0.67})_{1-x}Br_xI_x$ Glasses," Journal of Non-Crystalline Solids, vol. 106, No. 1-3, pp. 50-55, Dec. 1988.

*Primary Examiner*—Martin Lerner
*Attorney, Agent, or Firm*—Stevens, Davis, Miller & Mosher

[57] ABSTRACT

An infrared-transmissive lens formed by using glass including germanium and selenium or germanium and sulfur as main components and a human body detecting device including the lens and a pyroelectric infrared sensor are disclosed. With this configuration, glass having excellent transmissivity of infrared rays, no poisonous characteristic and difficulty to be crystallized is obtained and the glass is subjected to thermal pressing work to form a lens. The lens and a pyroelectric infrared sensor are combined to obtain a scanning type human body detecting sensor device. Further, the scanning type human body detecting sensor device can be used to detect a plurality of human bodies simultaneously.

8 Claims, 3 Drawing Sheets

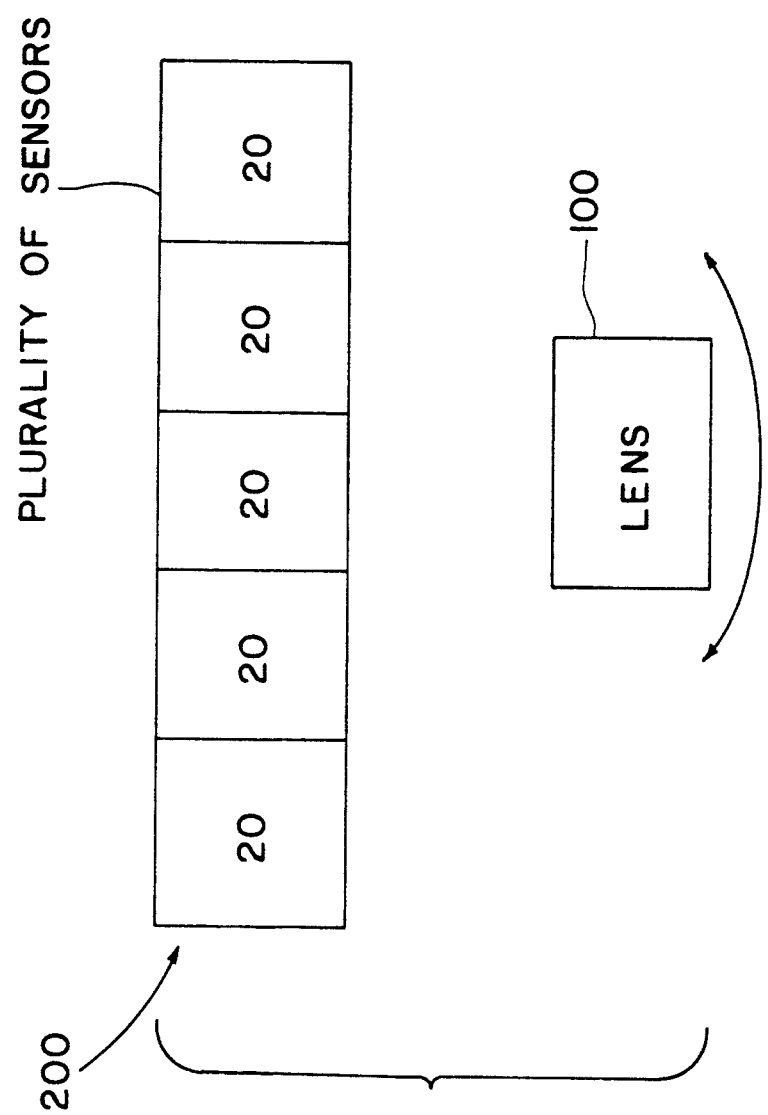

INFRARED-TRANSMISSIVE LENS AND HUMAN BODY DETECTING SENSOR USING THE SAME

BACKGROUND OF THE INVENTION

The present invention relates to an infrared-transmissive lens made of chalcogenide glass and a human body detecting sensor including the lens and a pyroelectric infrared sensor.

Human body detecting sensors using pyroelectric infrared sensors are widely used in the field of home electric appliances and industrial equipments. The sensors are used, for example, to open and close a door, to operate a water tap for a toilet bowl and to operate an air conditioner. Generally, a filter for transmitting only infrared rays is provided before an infrared sensor in order to collect infrared rays having a wavelength of 8 to 12 μm emitted from a human body effectively. These filters have heretofore been made of silicon, germanium and metal halide.

FIG. 2 schematically illustrates an example of a conventional human body detecting sensor. As shown in FIG. 2, a lens 12 is disposed before a plurality of pyroelectric infrared sensors 11 (only one sensor is shown in the drawing for clarification) arranged side by side and the lens 12 is moved right and left to send an image to the pyroelectric infrared sensor. A lens driver for moving the lens is disposed in alignment with the lens in the vertical direction and hence the driver is not shown. Electrodes 13 for obtaining a voltage generated by the pyroelectric infrared sensor 11 are disposed on both sides of the infrared sensor 11 and a chopper 14 for intensity-modulating the infrared rays is disposed before the infrared sensor 11. The chopper is rotated at a constant speed by a chopper driver 15. Further, the infrared sensor 11 is supported by supporting rods 16 and an output signal of the infrared sensor 11 is delivered by lead wires 17 to outside.

SUMMARY OF THE INVENTION

However, there is a problem that silicon or germanium has small transmissivity for infrared rays having wavelengths of 8 to 12 μm and is expensive. For example, the transmissivity of silicon having a thickness of 2 mm for a wavelength of 10 μm is 45% and is significantly smaller than the transmissivity of 75% of silver chloride which is one of metal halide and is a cause of wrong operation of the sensor. In addition, the cost of germanium is about three times that of high impurity silicon (about 250 thousand yen per kilograin) and has a problem in wide applications. Further, there is a problem that germanium is easily oxidized by water vapor and has reduced transmissivity for infrared rays.

On the other hand, metal halide has a high transmissivity for infrared rays, although metal halides have a problem in that they have light-resistant characteristic and poisonous characteristic. For example, silver chloride has a transmissive area of 0.4 to 28 μm capable of transmitting substantially visible rays to all area of infrared rays, although it is sensitive to ultraviolet rays having a wavelength of 0.4 μm or less and metallic silver is separated, so that the silver chloride is blackened rapidly and the transmissivity thereof for infrared rays is also reduced. In order to prevent this phenomenon, a shield film such as antimony sulfide must be provided on the surface which thus makes the device expensive. Further, well-known KRS-5 (mixture of thallium bromide and thallium iodide) has a transmissive area of 0.5 to 40 μm capable of transmitting substantially visible rays to all area of infrared rays, although there is a problem that thallium has an extremely strong poisonous characteristic.

Recently, an attempt has been made in which a lens made of material transmitting only infrared rays is disposed before a pyroelectric infrared sensor so that not only the presence of a human body but also the number of and temperature of human bodies are detected. However, it is difficult to form a lens of the above materials.

Accordingly, attention is paid to chalcogenide glass as an infrared-transmissive glass which tends to form a lens easily.

The chalcogenide glass comprises chalcogen elements (sulfur, selenium and tellurium) as main components and practically the chalcogenide glass comprising arsenic-sulfur, germanium-arsenic-selenium, germanium-selenium-tellurium or germanium-selenium-antimony is mainly studied and developed, while the first two materials including arsenic have a problem in the poisonous characteristic. Further, since the later two materials can not almost transmit visible rays, it is impossible to adjust the alignment of optical axes of a lens and a sensor upon assembling by means of eyes and an expensive infrared photographing apparatus which costs several tens of million yen is required. Additionally, there is a problem that the material is difficult to form a lens by pressing work since the material tends to be crystallized upon reheated.

Accordingly, it is an object of the present invention to provide an infrared-transmissive lens having transmissive characteristic of infrared rays of 8 to 12 μm emitted from a human body, no poisonous characteristic, and which is easy to form by pressing work by virtue of difficulty to be crystallized and excellent chemical resistibility, and a human body detecting sensor using the infrared-transmissive lens.

Further, it is another object of the present invention to attain infrared-transmissive materials which transmit infrared rays and visible rays and have the above-described features.

In order to solve the problems, according to the present invention, the infrared-transmissive lens comprises non-oxide glass including non-oxide as starting material and germanium and sulfur or germanium and selenium as main components.

Further, the infrared-transmissive lens comprises glass including germanium of 5 to 55%, sulfur of 35 to 90% and iodine of 0 to 20% in atomic percent as main components.

In addition, the infrared-transmissive lens comprises glass including germanium of 15 to 50%, sulfur of 50 to 80% and antimony of 0 to 10% in atomic percent as main components.

Furthermore, the infrared-transmissive lens comprises glass including germanium of 10 to 25%, sulfur of 70 to 90% and tellurium of 0 to 10% in atomic percent as main components.

The infrared-transmissive lens comprises glass including germanium of 5 to 55%, sulfur of 35 to 80%, either selenium or tellurium of 0 to 10% and iodine of 0 to 20% in atomic percent as main components.

Further, the infrared-transmissive lens comprises glass including germanium of 5 to 22.5 atomic % and selenium of 77.5 to 95 atomic % as main components.

In addition, the lens comprises glass including germanium of 5 to 22.5 atomic %, selenium of 35 to 95 atomic % and iodine of 0 to 45 atomic % as main components.

The human body detecting sensor comprises the above infrared-transmissive lens and a pyroelectric infrared sensor.

With the infrared lens structured above, it has been found that chalcogenide glass including non-poisonous elements as main components is realized and the above problems can be solved. More particularly, main elements of the chalcogenide glass comprise sulfur, selenium, tellurium, germanium, arsenic and antimony. Among these elements, elements including poisonous characteristic are arsenic and selenium and an element including particularly strong poisonous characteristic is an arsenic. Since selenium is greatly contained in tomato juice and is essential nutritive substance for domestic animals, the poisonous characteristic of selenium itself is weak. Germanium and sulfur are selected as main components from the elements except arsenic on condition that visible rays are transmitted. That is, a human body sensor including a pyroelectric infrared sensor using a lens made of glass including at least germanium and sulfur as main components is promising. Further, with respect to a infrared-transmissive glass, it is effective to add iodine, antimony, tellurium and selenium for the purpose of enlargement of an infrared-transmissive area and suppression of crystallization in addition to germanium and sulfur. In order to adjust a coefficient of thermal expansion to a proper value, it is desirable to contain a small amount of lithium, sodium, copper, silver, boron, gallium, indium, silicon, tin, lead, bismuth, phosphorus, bromine.

A composition of the infrared-transmissive glass according to the present invention was selected by the following reason. A germanium-sulfur-iodine system (hereinafter described by symbol of elements such as GE-S-I system) does not form glass except when germanium is 5 to 55% and sulfur is 35 to 90%. Further, when iodine exceeds 20%, visible rays are not transmitted. A Ge-S-Sb system does not form glass except when germanium is 15 to 50% and sulfur is 50 to 80%. In addition, when antimony exceeds 10%, visible rays are not transmitted. A Ge-S-Te system does not form glass except when germanium is 10 to 25% and sulfur is 70 to 90%. Further, when tellurium exceeds 10%, visible rays are not transmitted. A Ge-S-I-Se (or Te) system does not form glass except when germanium is 5 to 55% and sulfur is 35 to 80%. Additionally, when selenium or tellurium exceeds 10% and iodine exceeds 20%, visible rays are not transmitted.

With the above configuration, a lens is realized capable of transmitting infrared rays to visible rays, having no poisonous characteristic, which is difficult to be crystallized and capable of being pressed.

When germanium and sulfur are main components, only infrared rays of 8 to 11 $\mu$m are transmitted but a condition that visible rays are transmitted is satisfied.

In addition, when a condition that infrared rays up to 12 $\mu$m can be transmitted is considered, germanium and selenium are main components.

Further, iodine may be contained in glass for improvement of stability as glass in addition to germanium and selenium. Antimony, tellurium and selenium may be contained for enlargement of the infrared-transmissive area and a small amount of lithium, sodium, copper, silver, boron, gallium, indium, silicon, tin, lead, bismuth, phosphorus and bromine may be also contained for rationalization of the coefficient of thermal expansion.

The reason that the composition is limited is as follows. A Germanium-selenium system (hereinafter described by symbol of elements such as Ge-Se system) does not form glass except when germanium is 5 to 22.5% and selenium is 77.5 to 95%. A Ge-Se-I system does not form glass except when germanium is 5 to 22.5%, selenium is 35 to 95% and iodine is 0 to 45%. When iodine exceeds 45%, infrared rays up to 12 $\mu$m are not transmitted.

BRIEF DESCRIPTION OF THE DRAWINGS

FIG. 3 is a block diagram of the human body sensor device of the present invention.

DESCRIPTION OF PREFERRED EMBODIMENT

Figure 1:
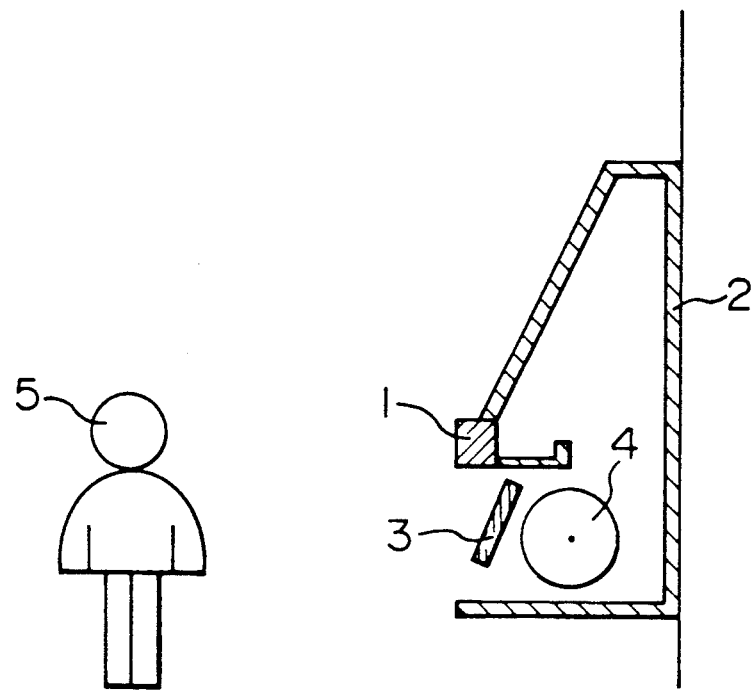
FIG. 1 schematically illustrates an air conditioner using an infrared detecting sensor according to the present invention.
Figure 2:
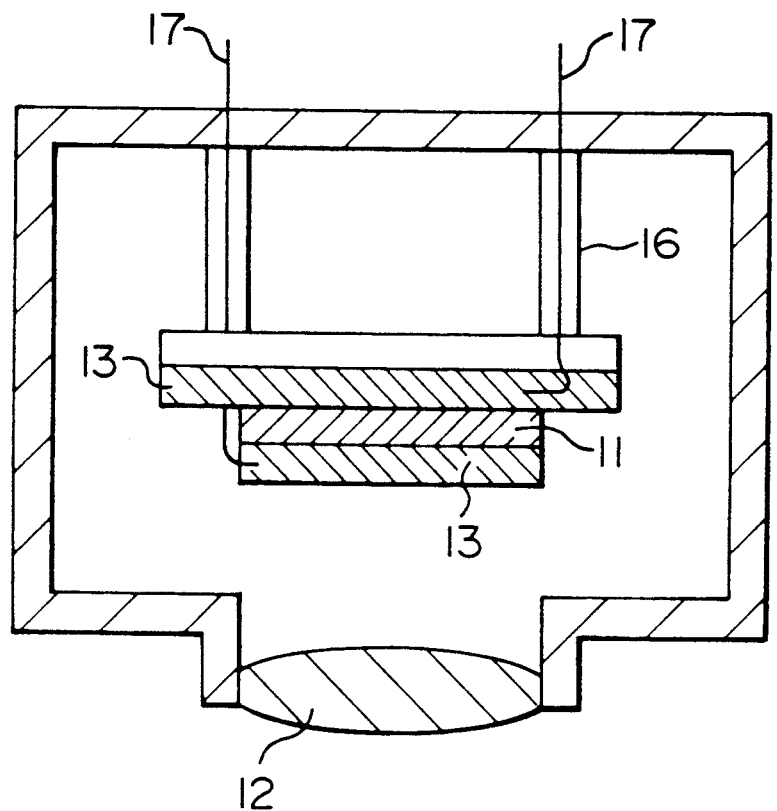
FIG. 2 is a sectional view of a conventional human body detecting sensor.
Figure 2:
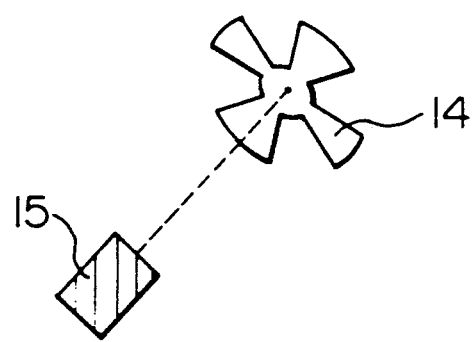

An embodiment of the present invention is now described.

EMBODIMENT 1

Ge and S were measured to be prepared with a ratio of Ge:S=25:75 in atomic percent and were put into an ampule made of quartz and sealed in vacuum. These elements contained in the ampule were heated and melted in an electric furnace at 800° C. for 12 hours to thereby obtain glass. The obtained glass was yellow when observed with the naked eyes and a sample of the glass having thickness of 2 mm transmitted 50% or more of infrared rays up to 10.5 $\mu$m.

EMBODIMENT 2

Ge, S and I were measured to be prepared with a ratio of Ge:S:I=30:60:10 in atomic percent and were put into an ampule made of quartz and sealed in vacuum. These elements contained in the ampule were heated and melted in an electric furnace at 800° C. for 12 hours to thereby obtain glass. The obtained glass was brown and transmitted 50% or more of infrared rays up to 11 $\mu$m. In this embodiment, no glass was formed by the above elements except when Ge was 5 to 55% and S was 35 to 90%. Further, when I exceeds 20%, visible rays are not transmitted.

EMBODIMENT 3

Ge, S and Sb were measured to be prepared with a ratio of Ge:S:Sb=30:60:10 in atomic percent and were put into an ampule made of quartz and sealed in vacuum. These elements contained in the ampule were heated and melted in an electric furnace at 950° C. for 12 hours to thereby obtain glass. The obtained glass was dark brown and transmitted 50% or more of infrared rays up to 11 $\mu$m. In this embodiment, no glass was formed by the above elements except when Ge was 15 to 50% and S was 50 to 80%. When Sb exceeds 10%, visible rays were not transmitted.

EMBODIMENT 4

Ge, S and Te were measured to be prepared with a ratio of Ge:S:Te=23.75:71.25:5.00 in atomic percent and were put into an ampule made of quartz and sealed in vacuum. These elements contained in the ampule were heated and melted in an electric furnace at 900° C.

for 12 hours to thereby obtain glass. The obtained glass was blue and transmitted 50% or more of infrared rays up to 11 μm. In this embodiment, no glass was formed by the above elements except when Ge was 10 to 25% and S was 70 to 90%. When Te exceeds 10%, visible rays were not transmitted.

EMBODIMENT 5

Ge, S, I and Se were measured to be prepared with a ratio of Ge:S:I:Se=23.75:61.25:10.50 in atomic percent and were put into an ampule made of quartz and sealed in vacuum. These elements contained in the ampule were heated and melted in an electric furnace at 900° C. for 12 hours to thereby obtain glass. The obtained glass was blue and transmitted 50% or more of infrared rays up to 11 μm. In this embodiment, no glass was formed by the above elements except when Ge was 5 to 55% and S was 35 to 80%. When Sb or Te exceeds 10% and I exceeds 20%, visible rays were not transmitted.

EMBODIMENT 6

The glass of the embodiments 1 to 5 was immersed in hot water of 70° C. for one hour and it could be confirmed that the surface thereof is not quite changed and the glass has excellent chemical durability.

The glass of the embodiment 1 was pressed at 400° C. to form a lens. The lens had a thickness of about 2 mm, F number of 1.0 and a focal distance of 3 mm. Lead fluoride was evaporated to be deposited on both sides of the lens to form an antireflection film. The lens was disposed before 10 pyroelectric type infrared sensors put side by side to form the human body detecting sensor shown in FIG. 1. Referring to FIG. 3, the human body sensor device includes a plurality of side-by-side sensor elements 20 forming a sensor 200 and a movable lens 100 for directing infrared light towards the sensor elements 20. The lens was adapted to be moved 120 degrees right and left. Two men stood 50 cm apart from the front of the sensor and the lens was moved to examine an output voltage of the sensor. A voltage of about 200 mV was produced when the human body was detected and the performance of the sensor could be confirmed.

Further, lenses were formed by the glass of the embodiments 2 to 5 and subjected to a performance examination for a sensor, the same effects were obtained except that a slightly high output voltage was produced correspondingly to widening of an infrared-transmissive wavelength.

EMBODIMENT 7

Germanium and selenium were measured to be prepared and mixed with a composition shown in Table 1 and with a ratio that germanium was 5 to 22.5% and selenium was 77.5 to 95% in atomic percent and were put into an ampule made of quartz and sealed in vacuum. These elements contained in the ampule were heated and melted in an electric furnace at 900° C. for 12 hours to thereby obtain glass. The obtained glass was gray when observed with the naked eyes and a sample thereof having a thickness of 2 mm transmitted 50% or more of light up to 12 μm. No glass was formed by the above elements when Ge was smaller than 5% or larger than 22.5%.

TABLE 1

|   | Ge:Se | Grass transition point (°C.) | Thermal Expansion Coefficient ($\times 10^{-5}$) | Color |
|---|---|---|---|---|
| 1 | 4:96 | (no glass) | | |
| 2 | 5:95 | 67 | 4.8 | gray |
| 3 | 6:94 | 75 | 4.4 | gray |
| 4 | 10:90 | 100 | 3.6 | gray |
| 5 | 15:85 | 128 | 3.1 | gray |
| 6 | 20:80 | 171 | 2.8 | gray |
| 7 | 22.5:77.5 | 200 | 2.6 | gray |
| 8 | 25:75 | (no glass) | | |
| 9 | 30:70 | (no glass) | | |
| 10 | 33.3:66.7 | (no glass) | | |

EMBODIMENT 8

As an example of a Ge-Se-I system, germanium, sulfur and iodine were measured to be prepared and mixed with a ratio of Ge:Se:I=20:35-75:5-45 in atomic percent as shown in Table 2 and were put into an ampule made of quartz and sealed in vacuum. These elements contained in the ampule were heated and melted in an electric furnace at 900° C. for 12 hours to thereby obtain glass. The obtained glass was gray and had a transmissivity of 50% or more for light up to 12 μm.

TABLE 2

|   | Ge:Se | Grass transition point (°C.) | Thermal Expansion Coefficient ($\times 10^{-5}$) | Color |
|---|---|---|---|---|
| 1 | 20:35:45 | 110 | 4.8 | gray |
| 2 | 20:45:35 | 121 | 4.2 | gray |
| 3 | 20:55:25 | 130 | 3.7 | gray |
| 4 | 20:65:15 | 145 | 3.3 | gray |
| 5 | 20:75:5 | 165 | 3.0 | gray |

EMBODIMENT 9

Glass of the samples 1 to 5 shown in Table 1 was immersed in hot water at 70° C. for one hour. Consequently, it could be confirmed that the surface of the glass is not quite changed and the glass has excellent chemical durability.

EMBODIMENT 10

Glass of the sample 6 shown in Table 1 was pressed into a lens. The lens had a thickness of about 2 mm, F number of 1.0 and a focal distance of 8 mm. Lead fluoride was evaporated to be deposited on both sides of the lens to form an antireflection film. The lens was disposed before an array of 10 pyroelectric type infrared sensors arranged side by side to form the human body sensor device shown in FIG. 1. The lens was adapted to be moved 120 degrees right and left horizontally. Two men stood 50 cm apart from the front of the sensor and the lens was moved to examine an output voltage of the sensor. Thus, the pyroelectric type infrared sensor produced a voltage of about 350 mV when the human body was detected and the performance of the sensor could be confirmed.

Lens were formed of even glass of the samples 2 to 7 of Table 1 and glass of Table 1 and were subjected to the performance examination of the sensor. Thus, the same result has been obtained.

EMBODIMENT 11

In an application to an air conditioner, as shown in FIG. 1, the infrared detecting sensor of the embodiments 1 to 5 is disposed in a body 2 of the air conditioner and two men stand 50 cm apart from the front of the air conditioner. Thus, a louver 3 is adapted to be directed alternately in the direction that the human body 5 is detected. Consequently, air sent from a fan 4 is automatically directed to the human body 5 through the louver 3 by means of a signal of the sensor even without manual operation of the louver by a user.

The application of the infrared detecting sensor according to the present invention is not limited to the air conditioner of embodiment 11, for example the sensor can be applied to an application of an illuminating apparatus in which the human body detecting sensor is installed in a lighting device at a gatepost, for example, and light emitted from the lighting device is directed to a human body, to thereby facilitate to confirm the number of visitors at night. Further, in an application of a water supply apparatus, the human body detecting sensor is installed in a water tap, for example, and a shower is adapted to be directed to a plurality of human bodies, so that it can be implemented that an outlet of the shower is not required to be operated by hand.

Since the human body detecting sensor according to the present invention uses chalcogenide glass which transmits visible rays and does not have poisonous characteristic as glass for an infrared focused lens, the sensor and the detecting apparatus can be assembled easily and the lens can be formed by pressing work. Accordingly, the sensor can be widely used in popular equipments and industrial instruments because of stability and cheapness thereof.

We claim:

1. A human body detecting sensor device wherein infrared rays are directed towards sensors, said device comprising:

a movable infrared-transmissive lens comprising non-oxide glass formed of a compressed mixture of a non-oxide as a starting material and germanium and sulfur as main components; and a plurality of pyroelectric infrared sensors arranged side-by-side with one another;

said lens being movable relative to said sensors such that said lens directs said infrared rays toward each of said infrared sensors as said lens is moved.

2. A human body detecting sensor according to claim 1, wherein said glass includes germanium of 5 to 55%, sulfur of 35 to 90% and iodine of 0 to 20% in atomic percent as main components.

3. A human body detecting sensor according to claim 1, wherein said glass includes germanium of 15 to 50%, sulfur of 50 to 80% and antimony of 0 to 10% in atomic percent as main components.

4. A human body detecting sensor according to claim 1, wherein said glass includes germanium of 10 to 25%, sulfur of 70 to 90% and tellurium of 0 to 10% in atomic percent as main components.

5. A human body detecting sensor according to claim 1, wherein said glass includes germanium of 5 to 55%, sulfur of 35 to 80%, either selenium or tellurium of 0 to 10% and iodine of 0 to 20% in atomic percent as main components.

6. A human body detecting sensor device wherein infrared rays are directed towards sensors, said device comprising:

a movable infrared-transmissive lens comprising non-oxide glass formed of a compressed mixture of a non-oxide as a starting material and germanium and selenium as main components; and a plurality of pyroelectric infrared sensors arranged side by side one another;

said lens being movable relative to said sensors such that said lens directs said infrared rays toward each of said infrared sensors as said lens is moved.

7. A human body detecting sensor according to claim 6, wherein said glass includes germanium of 5 to 22.5 atomic % and selenium of 77.5 to 95 atomic % as main components.

8. A human body detecting sensor according to claim 6, wherein said glass includes germanium of 5 to 22.5 atomic %, selenium of 35 to 95 atomic % and iodine of 0 to 45 atomic % as main components.

* * * * *